Figure 1:
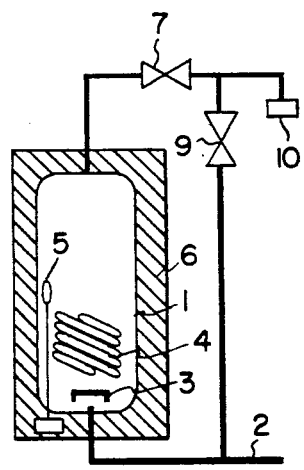

United States Patent [19]

Peteri et al.

[11] Patent Number: 5,093,897
[45] Date of Patent: Mar. 3, 1992

[54] APPARATUS FOR DISPENSING QUANTITIES OF WATER OF VARIABLE TEMPERATURES

[76] Inventors: Henri B. Peteri, Rozenburglaan 31, 3062 EB Rotterdam; Niels T. Peteri, Essenburgsingel 44b, 3021 AR Rotterdam, both of Netherlands

[21] Appl. No.: 594,746

[22] Filed: Oct. 9, 1990

[30] Foreign Application Priority Data

Oct. 10, 1989 [NL] Netherlands ............... 8902513

[51] Int. Cl.$^5$ ............... A47J 31/56; F24D 19/10; F24H 1/20; B67D 1/08
[52] U.S. Cl. ................ 392/450; 392/451; 122/4 A; 122/13.2; 126/362
[58] Field of Search ........... 392/451, 459, 449, 450; 126/361–362, 344; 122/4 A, 13.2; 137/340–341, 334

[56] References Cited

U.S. PATENT DOCUMENTS

| | | | |
|---|---|---|---|
| 2,422,492 | 6/1947 | Losee | 392/459 |
| 2,515,974 | 7/1950 | Araldsen | 392/449 |
| 2,530,382 | 11/1950 | Downs | 392/459 |
| 3,212,566 | 10/1965 | Karassik et al. | 126/362 |
| 3,254,839 | 6/1966 | McClanahan et al. | 126/362 |
| 3,351,130 | 11/1967 | Lowe | 126/362 |
| 3,992,607 | 11/1976 | Jolin | 392/459 |
| 4,200,039 | 4/1980 | Anderl | 99/302 R |
| 4,263,498 | 4/1981 | Meyers | 392/459 |
| 4,354,094 | 10/1982 | Massey et al. | 137/341 |
| 4,480,173 | 10/1984 | Butterfield | 392/450 |
| 4,575,615 | 3/1986 | Shigenobu et al. | 392/459 |
| 4,601,263 | 7/1986 | Shieh | 126/362 |

FOREIGN PATENT DOCUMENTS

| | | |
|---|---|---|
| 0307955 | 3/1989 | European Pat. Off. |
| 625857 | 2/1936 | Fed. Rep. of Germany |
| 2434336 | 1/1976 | Fed. Rep. of Germany |
| 3014493 | 10/1981 | Fed. Rep. of Germany |
| 1373900 | 11/1974 | United Kingdom |

*Primary Examiner*—Bruce A. Reynolds
*Assistant Examiner*—John A. Jeffery
*Attorney, Agent, or Firm*—Michael N. Meller

[57] ABSTRACT

An apparatus which dispenses small quantities of water of variable temperatures, and improved quality and taste, comprising a reservoir connected to the mains for heating and storing water at a temperature above its atmospheric boiling point, and an outlet for boiling water. The apparatus is fully filled with water under normal operating conditions. According to the invention, the apparatus has at least one outlet connected to a source of water having a temperature lower than the atmospheric boiling point.

10 Claims, 1 Drawing Sheet

APPARATUS FOR DISPENSING QUANTITIES OF WATER OF VARIABLE TEMPERATURES

This invention relates to an apparatus for dispensing—in particular—small quantities of water of variable temperatures, comprising a reservoir connected to the mains for heating and storing water at a temperature above its atmospheric boiling point, and an outlet for boiling water, the apparatus being fully filled with water during normal operating conditions.

Such an apparatus is described in Netherlands patent specification 172589. One problem in that apparatus is that the quality of the water deteriorates as its residence time within the reservoir exceeds a certain period of time. This detracts from the acceptance of instant boiling water apparatus with a reservoir for storage above the atmospheric boiling point, because the public has doubts as to the quality of the water dispensed by the apparatus, which is often partly intended for human consumption. It is one object of the present invention to provide a solution to this problem.

Shortening the residence time of the water in the reservoir by reducing the reservoir volume is impracticable in the practice of the use of the apparatus, which is especially for domestic purposes. In fact, the need of boiling water for household purposes varies greatly, from a number of cups a day, for example, for coffee or tea, to some liters in a short period of time, for example, when cooking meals. It is precisely in those cases that too small a capacity leads to complaints. Even when a high-capacity heating element is used, a reservoir of less than 2 or 3 liters, when its entire volume has been consumed, leads to waiting periods which, though they may be short, cause irritation among users in a device which is claimed to provide instant service.

Another solution, namely, advising users after a period in which the apparatus has not been used to allow the boiling water to flow away for the sake of the taste, has an adverse effect on consumers. The fact is that this introduces doubts as to the taste qualities of the water, and in addition, allowing boiling water to run away without using it is—correctly—regarded as a waste of energy.

According to the present invention, there is provided an apparatus as defined in the opening paragraph, which is capable of meeting greatly varying requirements of instant boiling water, with a relatively short residence time of water in the reservoir which is heated above its atmospheric boiling point, so as to avoid the drawback of deterioration in taste qualities of the water.

According to the present invention, the apparatus has at least one outlet connected to a source of water having a temperature lower than the atmospheric boiling point.

There is thus obtained the advantage that not only is the residence time of the water heated above its atmospheric boiling shortened, but the apparatus is capable of dispensing water having a temperature lower than its atmospheric boiling point.

It has been found that the apparatus according to this invention not only leads to a better taste of the boiling water supplied, but also to a cheaper provision of boiling water and hot water than where separate devices are used.

According to one aspect of the invention, the water heated above its atmospheric boiling point is also used for providing hot water, for example, for dishwashing or for washing the hands. In this way, in a given period of time, a regular throughflow through the apparatus is ensured.

The apparatus according to this aspect of the invention is characterized in that the reservoir in which water is heated and stored at a temperature above its atmospheric boiling point is connected to an outlet for both boiling water and hot water of a lower temperature through a mixing device to which a source of water having a temperature lower than its atmospheric boiling point is connected.

Accordingly, the apparatus according to this invention may in principle comprise a reservoir section in which water is heated and stored at a temperature above its atmospheric boiling point with a connection to the water mains which terminates in the bottom part of the reservoir, and permitting the ingress of cold water as well as possible in the horizontal direction, and outlet means connected to the top of the reservoir, not only for dispensing boiling water, but also for hot water which is obtained by using means for admixing colder water on its way to the outlet opening. Generally speaking, the water to be mixed upstream of the outlet opening will be tap water.

According to another aspect of the invention, the reservoir comprises two sections arranged in series, the mains being connected to the bottom of the reservoir section in which water is heated and stored at a temperature below its atmospheric boiling point. The top of this first reservoir section is connected to the second reservoir section, in which water is heated and stored at a temperature above its atmospheric boiling point, and to the top of which an outlet for boiling water is connected.

According to this embodiment, the source of water having a temperature lower than its atmospheric boiling point is the water mains and/or the reservoir section in which water is stored at said lower temperature. In this embodiment, the reservoir for water having a temperature above its atmospheric boiling point may be smaller than that in the embodiment described before, as a consequence of which the average residence time of the water in said reservoir is shortened. In fact, as the water in the first reservoir is present at an elevated temperature, and this water replaces water drawn off from the second reservoir, only a short heating period is needed to adjust the water supplied to the second reservoir to a temperature above its atmospheric boiling point. Indeed, the apparatus according to this invention also offers advantages over and above existing, separate devices in terms of heat economy.

It is noted that British patent application 2,079,908 relates to an apparatus for dispensing steam, boiling and non-boiling water. Apart from its complex construction, that apparatus is not fully filled with water during normal operating conditions, in view of the necessary presence of a level regulation. As a consequence, water is expelled under varying vapor pressure. In addition, air collects in the top of the device, which gives rise to problems of corrosion. In the apparatus described in German patent specification 625857, too, boiling water is expelled under vapor pressure. The apparatus is provided with a float to ensure sufficient vapor space in the apparatus.

U.S. patent specification Ser. No. 4,575,615 relates to an apparatus consisting of two compartments interconnected by means of a screen plate. Water having a temperature of approximately 85° C. can be drawn off from the lower part. The water in the top part is maintained at a higher temperature than is the water in the bottom part. The water having a temperature just below 100° C. is provided by passing water from the bottom part of the apparatus through a heat exchanger arranged in its top part.

European patent publication 0 307 955 relates to a coffee making machine, from which wet steam and hot water, i.e. non-boiling water, can be drawn off. The machine is provided with a pump which provides the driving force when water is dispensed.

Figure 4:
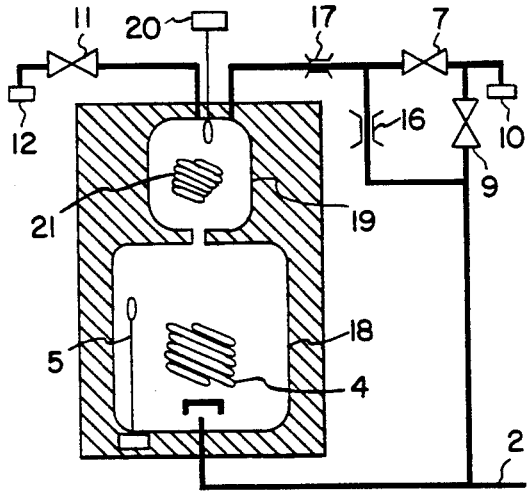
Figure 2:
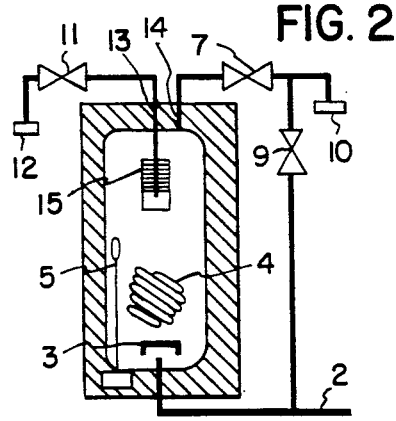
Figure 5:
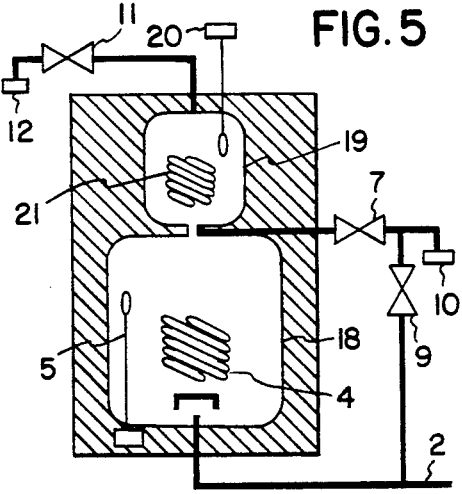
Figure 3:
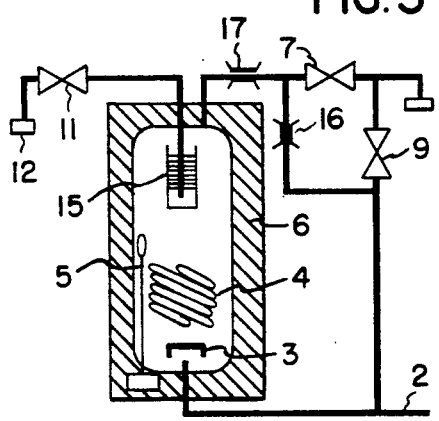
Figure 6:
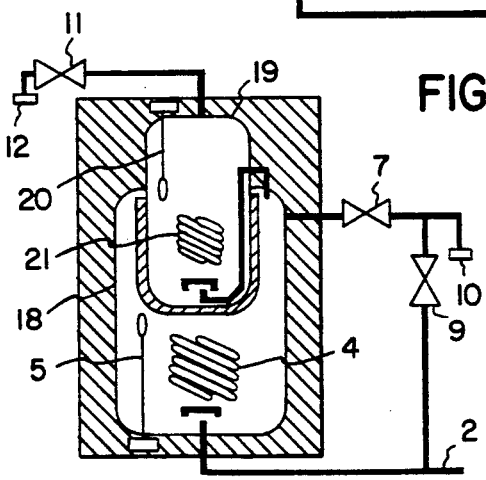

Some embodiments of the apparatus according to the invention will now be described, by way of example, and without any limitation being intended, with reference to the accompanying drawings, in which FIGS. 1, 2 and 3 are schematic illustrations of apparatuses of a first embodiment type; and FIGS. 4–6 show apparatuses of a second embodiment type.

In the variant embodiments of the apparatus according to the invention as shown schematically in the accompanying drawings, mainly two embodiments can be distinguished. Both can provide boiling water and are equipped with a reservoir in which tap water is heated and maintained at a temperature above its atmospheric boiling point, and both can also dispense hot water having a temperature below its atmospheric boiling point. In one embodiment, the entire reservoir contents are heated and maintained at a temperature above its atmospheric boiling point, and in the other embodiment, use is made of two reservoir sections connected in series with each other, the water in the last reservoir section being heated and maintained at a temperature above its atmospheric boiling point to provide boiling water and the last reservoir section but one is used to provide hot water and for feeding the last reservoir.

The first embodiment is less expensive to make than the second, but the second is preferred when, from the point of view of safety, the volume of the reservoir for water having a temperature above its atmospheric boiling point must be limited. In addition, in the second type, with comparable insulation, heat losses are less than in the first group, especially when the reservoir section which is at the higher temperature is provided fully or partially within the reservoir section for water at the lower temperature. In this latter case, the thermal insulation between the reservoir section at the higher temperature and the reservoir section at the lower temperature serves to ensure that heat transmission between the two is less than thermal losses to the outside of the reservoir section at the lower temperature.

In the embodiment illustrated in FIG. 1, a reservoir 1 is connected at the bottom to the water mains 2, which connection terminates at means 3 which horizontally deflect the incoming water. In reservoir 1, a heating element 4 is shown, which, controlled by a thermostat 5, heats the reservoir contents at a temperature above its atmospheric boiling point, e.g., 110° C., and maintains this temperature. The reservoir 1 is surrounded by an insulating jacket 6. The top of reservoir 1 is connected to an outlet line which, through a boiling-water valve 7, is connected to an outlet opening 10 for hot or boiling water. Connected to valve 7 is a cold-water pipeline with a cold-water valve 9. By means of valves 7 and 9, cold water and water heated above its atmospheric boiling point can be mixed in any desired ratio before leaving the outlet opening 10.

The apparatus illustrated in FIG. 2 is distinguished from that shown in FIG. 1 in that, in addition to the outlet line with the boiling-water valve 7, a separate outlet line with a boiling-water valve 11 and an outlet 12 is provided. The outlet lines have separate connections 13 and 14 in the top part of reservoir 1.

If desired, a carbon filter 15 may be mounted upstream of connection 13.

The variant embodiment of FIG. 3 differs from that shown in FIG. 2 in that, through a by-pass branching off upstream of the cold-water valve 9, cold water can be supplied to a point upstream of the boiling-water valve 7. In this way, no boiling water, but water having a lower temperature, e.g., 80° C., is supplied to valve 7. This temperature can be adjusted by throttle means 16 and 17 in the outlet lines concerned. If desired, throttle means 17 may be provided with a non-return valve.

It is observed that throttle means 16 and/or 17 may be provided in the insulated jacket 6.

FIG. 4 illustrates an example of a reservoir consisting of two sections. The water mains 2 is connected to the bottom part of the first, bottom reservoir section 18, in which the water is heated and maintained at a temperature below its atmospheric boiling point, e.g., 80° C. The top of the first reservoir section 18 is in connection with the bottom parts of the second reservoir section 19, whose contents can be heated and maintained at a temperature above the atmospheric boiling point by means of its own heating element 21 and a thermostat 20. By means of the boiling-water valve 11, boiling water can be dispensed.

As shown, the second reservoir section 19 is provided with a second outlet, which is in communication, through throttle means 17, with the boiling-water valve 7. Through a by-pass branching off upstream of the cold-water valve 9, cold water can be supplied to a point upstream of the boiling-water valve 7. Here again, therefore, no boiling water is supplied to valve 7, but water having a lower temperature, e.g., 80° C. This temperature can be adjusted with the help of throttle means 16 and 17 in the outlet lines concerned. This embodiment offers the additional advantage of an intensive throughflow in reservoir 19.

It is observed that the two reservoir sections 18 and 19 can naturally be arranged in separate insulation jackets, spaced apart some distance from each other.

In the embodiment illustrated in FIG. 5, the quantity of hot water and its temperature can be selected to suit requirements by means of the valve 7, which is in communication with the top part of the first reservoir 18 and with valve 9 in the water conduit 2.

As illustrated in FIG. 6, the boiling-water section may alternatively be arranged fully or partially within the hot-water section.

The dimensions of the several reservoirs are not critical and may vary within wide ranges.

Assuming that the apparatus is particularly intended for dispensing relatively small quantities of water, for example, for domestic use, the volume of the boiling-water reservoir in the embodiment of FIGS. 1–3 is, for example, up to 12 liters, more specifically 6–10 liters. The boiling-water reservoir in the embodiment of FIGS. 4–5 may be smaller, for example, up to 7 liters, and more particularly 1–5 liters. The volume of the reservoir for water of lower temperature according to FIGS. 4–5 will be mainly determined by dimensional considerations. A suitable volume of this reservoir is maximally 15 liters, particularly 8–12 liters.

We claim:

1. In an apparatus for dispensing small quantities of water of variable temperatures, and improved quality and taste comprising a reservoir connected to the mains for heating and storing water at a temperature above its atmospheric boiling point, and an outlet for boiling water, the apparatus being fully filled with water under normal operating conditions, the improvement which comprises that the apparatus has at least one outlet connected to a source of water having a temperature lower than the atmospheric boiling point.

2. An apparatus according to claim 1, wherein the reservoir (1) in which water is heated and stored at a temperature above its atmospheric boiling point is connected to an outlet (10) for both boiling water and hot water of a lower temperature through a mixing device (7, 9, 17, 16) to which a source of water (2, 18) having a temperature lower than its atmospheric boiling point is connected.

3. An apparatus according to claim 1, wherein the reservoir comprises two sections (18, 19) arranged in series, the mains being connected to a bottom of the first reservoir section (18) in which water is heated and stored at a temperature below its atmospheric boiling point, and the top of said first reservoir section (18) connected to a second reservoir section (19) in which water is heated and stored at a temperature above the atmospheric boiling point, and at the top of which an outlet for boiling water is connected.

4. An apparatus according to claim 1, wherein the source of water having a temperature lower than its atmospheric boiling point is the mains (2).

5. An apparatus according to claim 3, wherein a hot-water outlet line connected to the top of said first reservoir section (18), and the water mains (2) are connected through water valves (7, 9) forming a mixing device to said outlet (10).

6. An apparatus according to claim 3, wherein the second reservoir section (19) is arranged partially within said first reservoir section (18).

7. An apparatus according to claim 1, wherein the apparatus is provided with separate outlets for boiling water (12) and for hot water having a temperature lower than its atmospheric boiling point (10).

8. An apparatus according to claim 2, wherein the mixing device (7, 9, 17, 16) includes valves (7, 9) respectively provided in the boiling-water line and the line for hot or cold water, optionally supplemented with throttle means (17, 16) in said lines.

9. An apparatus according to claim 1, further comprising a carbon filter (15) arranged upstream of the connection (13) of the outlet line for water having a temperature higher than the atmospheric boiling point.

10. An apparatus according to claim 1, wherein the source of water having a temperature lower than its atmospheric boiling point is the reservoir section (18) in which water is stored at a temperature below its atmospheric boiling point.

* * * * *